(12) United States Patent
Shintani

(10) Patent No.: US 8,264,585 B2
(45) Date of Patent: Sep. 11, 2012

(54) IMAGING APPARATUS CAPABLE OF READILY SPECIFYING UNDESIRABLE PHOTOGRAPHING PARAMETERS FORM AUTO PHOTOGRAPHING PARAMETERS

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 475 days.

(21) Appl. No.: 12/360,569

(22) Filed: Jan. 27, 2009

(65) Prior Publication Data

US 2009/0195686 A1  Aug. 6, 2009

(30) Foreign Application Priority Data

Jan. 31, 2008  (JP) ................................. 2008-021767

(51) Int. Cl.
*H04N 5/222* (2006.01)
*H04N 5/225* (2006.01)

(52) U.S. Cl. .............. 348/333.05; 348/375; 348/333.11; 386/124

(58) Field of Classification Search ............. 348/333.11, 348/207.99, 350, 333.02, 333.05
See application file for complete search history.

(56) References Cited

U.S. PATENT DOCUMENTS

| | | | | |
|---|---|---|---|---|
| 7,839,448 | B2* | 11/2010 | Onozawa ....................... | 348/347 |
| 2002/0039146 | A1* | 4/2002 | Watanabe ..................... | 348/345 |
| 2003/0174230 | A1* | 9/2003 | Ide et al. ....................... | 348/345 |
| 2004/0085470 | A1* | 5/2004 | Miyashita ................ | 348/333.11 |
| 2004/0201770 | A1* | 10/2004 | Sawachi ........................ | 348/350 |
| 2006/0159444 | A1* | 7/2006 | Mokunaka ..................... | 396/299 |
| 2009/0096902 | A1* | 4/2009 | Kobayashi ..................... | 348/296 |

FOREIGN PATENT DOCUMENTS

| | | |
|---|---|---|
| JP | 06-130450 A | 5/1994 |
| JP | 08-220589 A | 8/1996 |
| JP | 2595717 Y2 | 3/1999 |
| JP | 2003-018433 A | 1/2003 |
| JP | 2003-187215 A | 7/2003 |
| JP | 2005-117478 A | 4/2005 |
| JP | 2006-186695 A | 7/2006 |
| JP | 2007-124245 A | 5/2007 |

* cited by examiner

*Primary Examiner* — Hung Lam
(74) *Attorney, Agent, or Firm* — Pearne & Gordon LLP

(57) ABSTRACT

An imaging apparatus capable of readily specifying undesirable photographing parameters from auto photographing parameters. This apparatus includes: a parameter determining section that determines a plurality of photographing parameters to set when a subject is photographed; a parameter setting section that sets each value of part of the plurality of determined photographing parameters; a moving image acquiring section that acquires a moving image using the part of set photographing parameters; a display section that displays the acquired moving image; an evaluation button that evaluates the photographing parameters; and a parameter changing section that, when the evaluation button is operated while the moving image is displayed, changes at least one of values of the part of set photographing parameters.

7 Claims, 4 Drawing Sheets

|  | EXPOSURE | | | | COLOR | FOCUS | | |
|---|---|---|---|---|---|---|---|---|
|  | SS | AV | ISO | ± | WB | AREA | ALLOWABLE DEPTH | FOCUS POSITION |
| AUTO | 2 | 2 | 2 | 2 | 2 | 1 | 1 | |
| P | 2 | 2 | 2 | 2 | 2 | 1 | 1 | |
| S | 2 | 2 | 2 | 2 | 2 | 1 | 1 | |
| A | 2 | 2 | 2 | 2 | 2 | 1 | 1 | |
| M | 2 | 2 | 2 | 2 | 2 | 1 | 1 | |
|  | | | | | | | | |
| PORTRAIT | | 2 | | | | 1 | | |
| BEAUTIFUL SKIN | | | 2 | | 2 | | 1 | |
| SELF PORTRAIT | 2 | | | | | | 1 | |
| SCENERY | | 2 | | 2 | 2 | | | 1 |
| SPORTS | 2 | | 2 | | | 1 | 1 | |
| PANNING | 2 | | 2 | | | | 1 | |
| NIGHT SCENERY & PERSON | 2 | | 2 | 2 | | 1 | | |
| NIGHT SCENERY | | | 2 | | 2 | | | 1 |
| CUISINE | | 2 | | 2 | 2 | | 1 | |
| PARTY | | | 2 | | 2 | 1 | | |
| CANDLE | | | 2 | | 2 | | | |
| BABY | 2 | | | | 2 | | | |
| PET | 2 | | | | 2 | | | |
| SUNSET | | | | 2 | 2 | | | 1 |
| HIGH SENSITIVITY | | | 2 | | | | | |
| STARRY SKY | | | 2 | | 2 | | | 1 |
| BEACH | | | | 2 | | | 1 | |
| SNOW | | | 2 | 2 | | | | |
| AERIAL PHOTO | 2 | | | | 2 | | | 1 |
| FIREWORKS | 2 | | | | 2 | | | 1 |
| UNDERWATER | | | 2 | | 2 | 1 | | |

FIG.2

| PHOTOGRAPHING MODE | PHOTOGRAPHING CONDITIONS EXPOSURE (ISO) | NG EVALUATION COUNT | PRIORITY |
|---|---|---|---|
| BEAUTIFUL SKIN | 100 | 0 | 1 |
| | 200 | 2 | 2 |
| | 400 | 15 | 3 |
| | 800 | 20 | 4 |

FIG.3

IMAGING APPARATUS CAPABLE OF READILY SPECIFYING UNDESIRABLE PHOTOGRAPHING PARAMETERS FORM AUTO PHOTOGRAPHING PARAMETERS

CROSS REFERENCE TO RELATED APPLICATIONS

The disclosure of Japanese Patent Application No. 2008-021767, filed on Jan. 31, 2008, including the specification, drawings and abstract, is incorporated herein by reference in its entirety.

BACKGROUND

1. Technical Field

The technical field relates to an imaging apparatus.

2. Description of the Related Art

Recently, digital cameras for converting optical images into electrical signals using imaging elements such as CCD (Charge Coupled Device) and CMOS (Complementary Metal-Oxide Semiconductor) sensors and digitizing and recording the resulting electrical signals, are becoming popular. Digital cameras are easy to handle, and therefore are used widely by photographers with a poor photographing technique and professionals.

Generally, to perform photographing, it is necessary to set photographing parameters related to focus, exposure, color and so on. If photographing parameters are not set appropriately, photographed images become failure images due to unadjusted focus, shake or inappropriate exposure. Then, to prevent failure images from being photographed as quickly as possible, there are a number of devices that install so-called "auto mode" for automatically setting photographing parameters, especially for a photographer with a poor photographing technique. However, auto mode is only an aid for photographing and there are cases where photographing is not possible as intended by the photographer. This is because parameters that must be set vary depending on the photographing technique of the photographer and the environment for photographing and the parameters that must be set in auto mode varies.

Patent Document 1 (Japanese Patent Application Laid-Open No. 2007-124245) proposes a technique of automatically optimizing the parameters to set in auto mode according to the photographer's intention or the condition of use. According to the technique disclosed in Patent Document 1, photographing parameters are automatically optimized according to the photographer's intension and the condition of use by playing back photographed images after photographing, extracting failure images according to the photographer's operation of the failure key and extracting and correcting the auto photographing parameters of failure factors from the extracted failure images. At this point, the auto photographing parameters that have caused the failure factors are extracted automatically or by selecting by the photographer the candidate parameters that are presented. Further, at this point, the parameters or candidate parameters are extracted based on the photographing environment and photographing parameters of failure images (meta data). The photographing environment is determined by each sensor or processing in a microcomputer, and the photographing parameters are set based on the resulting photographing environment.

However, with the above-explained conventional technique, a series of parameter extraction processings are carried out for the first time after photographing. To be more specific, as explained above, after photographing, photographed images are played back, failure images are extracted with the failure key and the photographing parameters of failure factors are extracted from the photographing environment (meta data) and photographing parameters of failure images. Therefore, there is a problem that it is difficult to specify the auto photographing parameters that have caused the failure factors. That is, there are a great number of auto photographing parameters and, even if a table is utilized, a certain limit is imposed upon the setting of the table. Therefore, it is difficult to specify the auto photographing parameters of true failure factors from the photographing environment of failure images and photographing parameters (meta data). It naturally follows that, when the accuracy of specifying the auto photographing parameters that have caused the failure factors decreases, the accuracy of parameters optimization decreases. Further, for example, Patent Document 1 discloses, as the environment for photographing, the degree of focus adjustment (AF evaluation value), AE (shutter speed, aperture opening value, gain, and the degree of flashing a flash lamp), diffuse reflection of outside light (white balance), and discloses, as the photographing parameters, the focus control parameters (AF evaluation value), AE control parameters (shutter speed, aperture opening value, signal processing gain, and the degree of flashing a flash lamp) and white balance control parameters.

SUMMARY

An object is therefore to provide an imaging apparatus that is able to readily specify undesirable photographing parameters in auto photographing parameters.

To achieve the above object, the imaging apparatus employs the configuration including: a parameter determining section that determines a plurality of photographing parameters to set when a subject is photographed; a parameter setting section that sets each value of part of the plurality of determined photographing parameters; a moving image acquiring section that acquires a moving image using the part of set photographing parameters; a display section that displays the acquired moving image; an evaluation button that evaluates the photographing parameters; and a parameter changing section that, when the evaluation button is operated while the moving image is displayed, changes at least one of values of the part of set photographing parameters.

BRIEF DESCRIPTION OF THE DRAWINGS

FIG. 2 shows an example of the associations between photographing modes and photographing conditions (photographing parameters) according to the present embodiment;

FIG. 3 shows an example of evaluation history information; and

DETAILED DESCRIPTION OF THE PREFERRED EMBODIMENT

An embodiment of the present invention will be explained below in detail with reference to the accompanying drawings.

Figure 1:
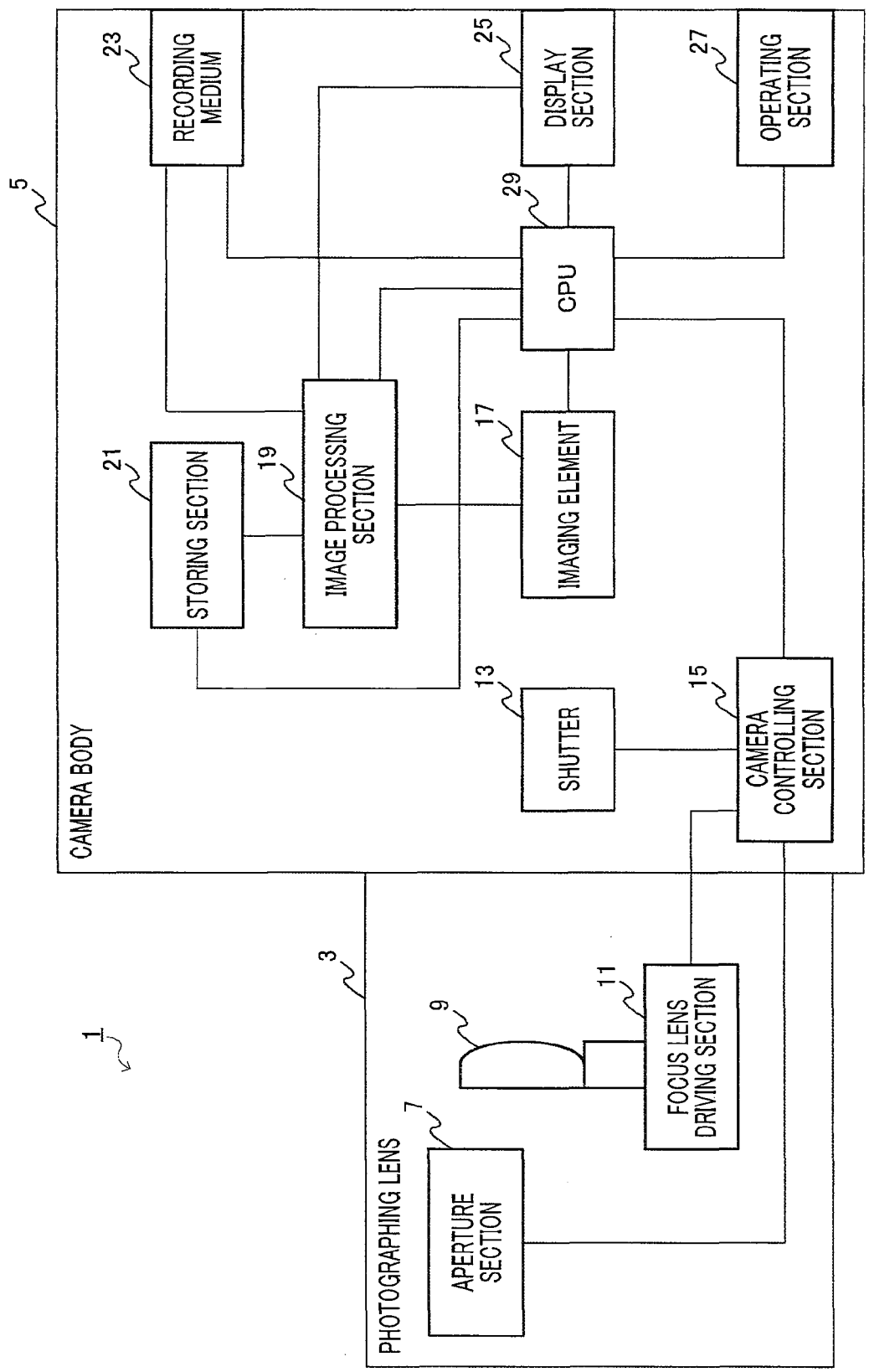
FIG. 1 is a block diagram showing a configuration of an imaging apparatus according to an embodiment of the present invention.

FIG. 1 is a block diagram showing a configuration of an imaging apparatus according to an embodiment of the present invention.

Imaging apparatus 1 shown in FIG. 1 is a digital camera (hereinafter simply "camera") with auto mode and roughly has photographing lens 3 and camera body 5.

Photographing lens 3 has aperture section 7, focus lens 9 and focus lens driving section 11. Photographing lens 3 is replaceable. Further, although an imaging apparatus with a replaceable lens employed in single lens reflex digital cameras is shown here as imaging apparatus 1, the present invention is not limited to this. Imaging apparatus 1 may be an imaging apparatus without a replaceable lens unlike compact digital cameras. In this case, shutter 13 is generally formed integrally with aperture section 7 or arranged in a position adjacent to aperture section 7.

Aperture section 7 is used to adjust the amount of passing light. To be more specific, aperture section 7 is used to change the amount of light reaching the imaging element (explained later) in camera body 5 according to the brightness of a subject. Further, focus lens driving section 11 drives focus lens 9 in the optical axis direction to focus on the above imaging element of camera body 5.

Camera body 5 includes: shutter 13; camera controlling section 15 that controls focus lens driving section 11 and shutter 13; imaging element 17 that is arranged in the back of shutter 13; image processing section 19 that carries out predetermined image processing by receiving as input an electrical signal outputted from imaging element 17; built-in storing section 21 that stores various data such as photographed images and photographing parameters; detachable recording medium 23 that mainly records photographed images; display section 25 that displays photographed images and displays various information related to the camera; operating section 27 that inputs the photographer's commands for operating the camera; and central processing unit (CPU) 29 that integrally controls sections 17 to 25.

Further, storing section 21 includes, for example, a ROM that stores read-out dedicated data such as a program and font and a RAM that stores data on a temporary basis. The RAM stores data such as photographed images and photographing parameters on a temporary basis. Instead of the ROM and the RAM, or together with these, storing section 21 may utilize a flash memory that combines the characteristics of a ROM that can hold data after power supply is turned off and the characteristics of a RAN that can rewrite data.

Camera controlling section 15 is electrically connected with aperture section 7 and focus lens driving section 11 in photographing lens 3 through a mount (not shown) for attaching photographing lens 3. Further, although a case is illustrated here where photographing lens 3 is replaceable, the same configuration is possible for so-called compact digital cameras in which the photographing lens cannot be detached.

Shutter 13 is used to adjust an input of a subject image to imaging element 17 and the amount of exposure. Imaging element 17 converts the subject image inputted through shutter 13 into an electrical signal. Shutter 13 and aperture section 7 are electrically connected with camera controlling section 15. Camera controlling section 15 controls the amount of exposure of shutter 13. To be more specific, camera controlling section 15 controls the aperture value in aperture section 7 and the shutter speed of shutter 13, so as to achieve appropriate exposure calculated by CPU 29.

Image processing section 19 carries out image processing of processing the electrical signal outputted from imaging element 17 and displaying the photographed images in display section 23. That is, image processing section 19 processes the electrical signal outputted from imaging element 17 and sequentially generates photographed images to display in display section 25 in real time. In case where camera body 5 is in photographing mode, display section 25 starts displaying images in real time when the power supply (not shown) is turned on, and displays the subject image based on the signal outputted from image processing section 19. Further, the photographed images generated in image processing section 19 are stored in storing section 21 and/or recording medium 23.

Operating section 27 has various operation buttons for a photographer to operate imaging apparatus 1. The operation buttons include, for example, a power supply button, a shutter button, a mode dial for selecting photographing mode, and various keys (for example, a previous key, a next key, an enter key, and a back key) for selecting photographed images and various information displayed in display section 25. Further, with the present embodiment, an evaluation button for evaluating photographing parameters is provided as an operation button. When the photographing parameters automatically set by the camera produce a result that the photographer does not intend, the photographer inputs his intention through the evaluation button. For example, depending on the timing to press the evaluation button, the evaluation button makes the camera automatically recognize the photographing parameters to evaluate. Although the method of operating the evaluation button will be explained later, the evaluation button is operated in a state where the shutter button is half-pressed. Consequently, the evaluation button is positioned and shaped to operate in, for example, a state where the shutter button is half-pressed. To be more specific, the thumb is the most functional finger in a half-pressed state, so that it is ideal to share the button provided in the back of the camera. It is equally possible to provide another pressing button in a range where the thumb can reach. Further, digital single lens reflex digital cameras are basically held by both hands, so that it is possible to provide a pressing button on the surface of the lens barrel side where the thumb of the left hand can perform the operation.

With the present embodiment, imaging apparatus (camera) 1 has auto mode. To be more specific, for example, imaging apparatus 1 includes an auto focus (AF) function, an auto exposure (AE) function and an auto white balance function.

The auto focus (AF) function refers to a function of automatically measuring the distance to the subject and adjusting the focus, that is, a function of automating the focus adjustment of the camera. The auto focus schemes include a scheme of measuring the distance to the subject using an ultrasound wave or infrared ray (active scheme), a scheme of utilizing contrast (the difference between brightness and darkness) in the image (contrast detection scheme) and a scheme of utilizing the phase difference between images (phase difference detection scheme). The photographing conditions related to focus include, for example, an area, an allowable depth and a focus position. The area is the portion to focus upon, in the photographing screen. The allowable depth is the range in which blur of a point image is within the circle of confusion (for example, 33 μm in case of a silver-salt camera) and in a state where the focus is adjusted on the imaging plane, that is, a subject distance difference that allows blur of the point image. The allowable depth varies depending on the aperture value. The focus position refers to the practically center value for the allowable depth, that is, the so-called just-focus position.

To perform the AF operation, upon which area the focus needs to be adjusted in a plurality of AF areas is determined subjectively by the photographer or determined by a predetermined algorithm inside the camera (for example, the area where there is the face is determined by face detection or the area where there is the nearest object is determined). Then, the focus position is measured in the center of the area and focus lens 9 is driven. Next, exposure is started. At this point, unless the photographer performs manual control, the camera performs metering and, depending on this result, sets exposure according to a predetermined program diagram. Further, in case of a camera that can set scene mode (explained later), for example, long-distance view mode makes it easier to adjust focus upon the entire long-distance view by decreasing exposure as much as possible and making the allowable depth deep. On the contrary, portrait mode beautifully emphasizes the person to photograph, by opening the aperture as much as possible, making the allowable depth shallow and adjusting focus only upon the person. Further, the AF operation is basically the same in all AF schemes. However, the mechanical difference is that, with phase difference AF, the distance can be measured only in part where the phase difference detecting section is provided and, therefore, the area is limited. Further, the phase difference detecting section cannot detect the face, which makes difficult the combination with face detection.

The auto exposure (AE) function refers to a function of automatically determining exposure of the camera. Auto exposure photographing modes include, for example: program AE mode ("P" mode) for automatically controlling both the aperture value (F-number) and shutter speed; shutter-priority AE mode ("S" mode) for automatically controlling the aperture value by fixing the shutter speed; aperture-priority AE mode ("A" mode) for automatically controlling the shutter speed by fixing the aperture value; and manual exposure mode ("M" mode) for the photographer to determine the aperture value and the shutter speed. In program AE mode, even if the brightness of the subject changes, the camera automatically determines the combination of the aperture value and the shutter speed to achieve appropriate exposure at all times. In shutter-priority AE mode, when the photographer selects the shutter speed, the camera automatically determines the aperture value for appropriate exposure. In aperture-priority AE mode, when the photographer selects the aperture value, the camera automatically determines the shutter speed for appropriate exposure. These photographing modes are collectively referred to as "P/S/A/M modes" as appropriate.

Further, as other auto exposure photographing modes, there is, for example, so-called "scene mode" for setting auto exposure matching each photographing scene. Scene mode makes possible photographing with the optimal setting by selecting scene mode according to the situation or subject. Examples of scene modes include "portrait," "beautiful skin," "self portrait," "scenery," "sports," "panning," "night scenery & person," "night scenery," "cuisine," "party," "candle," "baby," "pet," "sunset," "high sensitivity," "starry sky," "beach," "snow," "aerial photo," "fireworks" and "underwater." Further, it is considered that the scene modes are a type of program AE mode and the exposure controlling scheme for beginners who cannot use well shutter-priority mode or aperture-priority AE mode.

Furthermore, "auto mode" refers to photographing mode for photographing by leaving all settings to the camera.

Photographing conditions related to exposure include, for example, the shutter speed ("SS"), the aperture value ("AV" value), an ISO sensitivity ("ISO") and an exposure correction ("±": plus (+) correction and minus (−) correction). Here, the AV value (aperture value) is represented by the following equation using the F-number for aperture.

$$AV = \log_2 F^2 = 2 \log_2 F$$

Further, exposure correction is specified by the direction and the number of stops. The direction of exposure correction is corrected to plus (+) in a case where exposure is likely to be under such as a case where there are a number of bright parts other than the main subject in the metering range, and is corrected to minus (−) in a case where exposure is likely to be over such as a case where there are a number of dark parts other than the main subject in the metering range. To achieve appropriate exposure, it is necessary to set the shutter speed, the aperture value, the ISO sensitivity and the exposure correction (the direction and the number of stops) appropriate according to the condition of the subject.

The auto white balance function is related to white balance (white color correction), that is, the function for performing correction such that white color is precisely displayed white in a state of the light sources where color temperatures vary, and refers to automatically deciding the condition of light upon the subject and reproduce an appropriate color state. The photographing conditions related to color include such white balance (WB).

FIG. 2 shows an example of the associations between photographing modes and photographing conditions (photographing parameters) according to the present embodiment.

As shown in FIG. 2, each photographing mode is associated in advance with the photographing conditions (photographing parameters) that must be set. This association is stored in the ROM or the flash memory in storing section 21 in the form of the table. For example, in auto mode and P/S/A/M modes, the shutter speed (SS), the aperture value (AV), the ISO sensitivity (ISO) and the exposure correction (±) are set as the photographing parameters for exposure, the white balance (WB) is set for color, and the area and the allowable depth are set for focus. Further, in scene mode, optimal setting is performed to achieve appropriate exposure, color and/or focus according to each photographing scene. For example, when scene mode is "portrait," the aperture value (AV) is set for exposure and the area is set for focus.

With the present embodiment, the evaluation button provided in operating section 27 evaluates photographing parameters which are automatically set. With the example of FIG. 2, the photographing parameters to evaluate are narrowed down per photographing scene. The numbers "1" "2" and "2" in FIG. 2 show the timings to press the evaluation button. As explained below, "1" is the timing for the shutter half-press operation and "2" is the timing for the shutter full-press operation. That is, with the example of FIG. 2, the photographing parameters related to focus are evaluated upon the shutter half-press operation and the photographing parameters related to exposure and color are evaluated upon the shutter full-press operation.

The evaluation result is stored per photographing mode as history information and is used to set or update the photographing parameters. To be more specific, for example, the values of photographing parameters before (as the NG condition) or after (as the OK condition) photographing parameters changed when the evaluation button is operated change, are stored per photographing mode, so that the setting values of the photographing parameters are determined based on these stored values before or after the photographing parameters change. By this means, it is possible to learn the user's preferences based on the evaluation result of the evaluated photographing parameters and automatically perform photographing in accordance with the user's preferences.

FIG. 3 shows an example of evaluation history information.

As shown in FIG. 3, the evaluation history is stored in, for example, the form of a table. Here, this table is referred to as an "evaluation history table." This evaluation history table includes photographing mode, photographing conditions, NG evaluation count and priority as items. To be more specific, for example, the evaluation history table is configured by storing per photographing mode the candidate setting value in each photographing condition and NG evaluation count and priority for the candidate setting value in each photographing condition. Here, the candidate setting value in each photographing condition is determined in advance as a value that is configurable in auto mode. Further, the NG evaluation count refers to the evaluation count by the evaluation button and is updated every time the evaluation button is operated. Further, the priority shows which condition is preferentially used in case where photographing is possible under any condition using the photographing condition parameters (with the example of ISO sensitivity of FIG. 3, 100, 200, 400 and 800). With the example of FIG. 3, when photographing mode is "beautiful skin," each ISO sensitivity (ISO) of 100, 200, 400 and 800 is stored as a configurable photographing condition for exposure and the current NG evaluation count and priority are stored for each ISO sensitivity. With the example of the ISO sensitivity of FIG. 3, the parameters include 100, 200, 400 and 800 and, when the subject is bright enough and photographing is possible by any parameters, priority is assigned in order from the lowest sensitivity such that noise in a photographed image becomes minimum. Each photographing condition (photographing parameters) is set or updated based on the priority in the evaluation history table.

Figure 4:
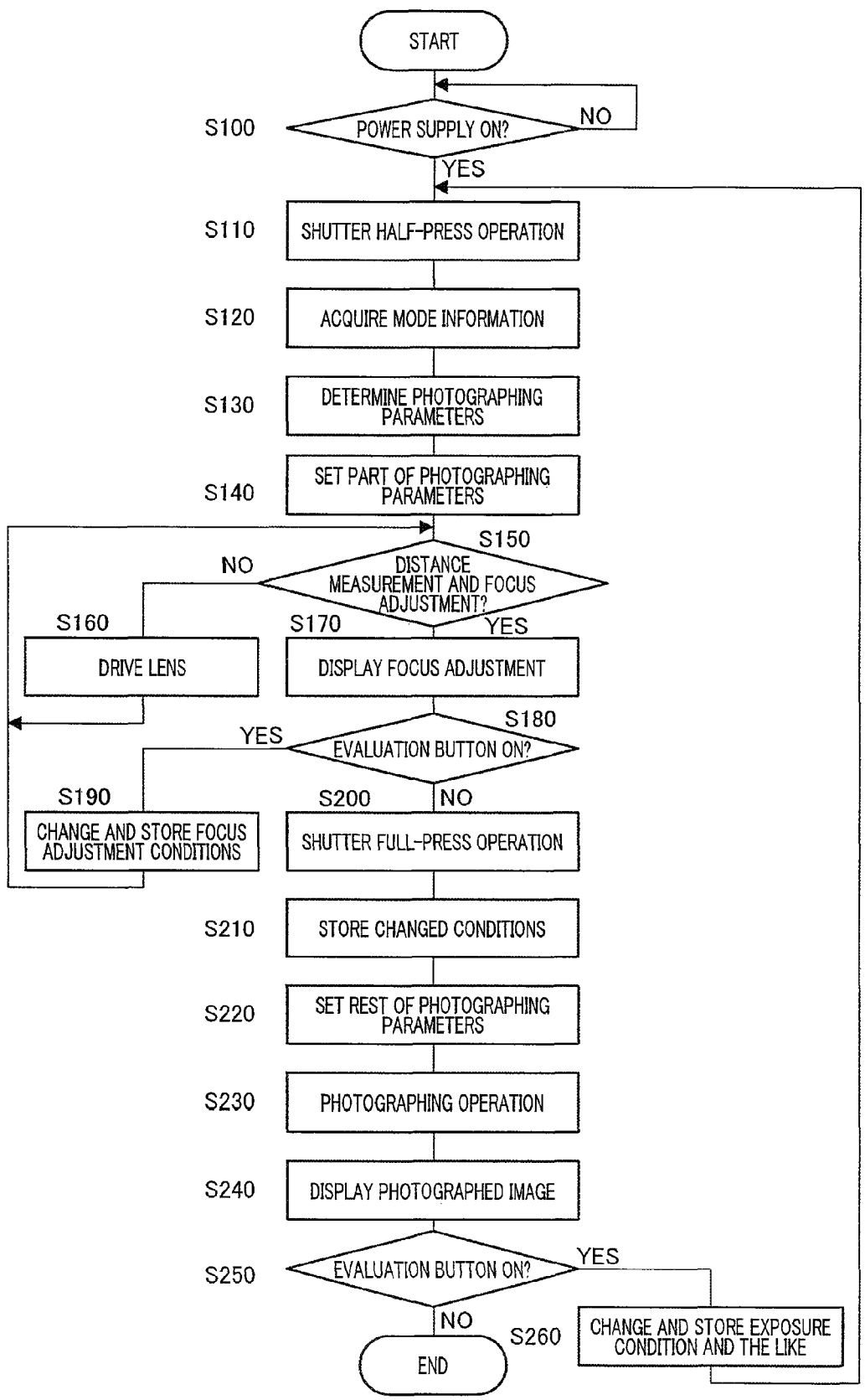
FIG. 4 is a flowchart showing an example of the operation of the imaging apparatus according to the present embodiment.

Next, the operation of imaging apparatus 1 having the above configuration will be explained using FIG. 4. FIG. 4 is a flowchart showing an example of the operation of the imaging apparatus according to the present embodiment. Further, the flowchart shown in FIG. 4 is stored in storing section 21 (particularly, ROM) as a control program and is executed by CPU 29. Further, although only photographing parameters shown in FIG. 2 are illustrated as photographing parameters for ease of explanation, it naturally follows that the actual photographing parameters are not limited to these.

First, in step S100, it is decided whether or not the power supply is turned on. The power supply is turned on and off by the power supply button provided in operating section 27. As a result of this decision, when the power supply is turned on (S100: YES), the flow proceeds to step S110, and, when the power supply is not turned on (S100: NO), stand-by mode continues until the power supply is turned on.

In step S110, the photographer performs the shutter half-press operation. To be more specific, the photographer performs this shutter half-press operation by half-pressing the shutter button provided in operating section 27. CPU 29 receives a signal from the shutter button reporting that the shutter half-press operation is performed.

Then, in step S120, CPU 29 acquires mode information. The mode information shows in what photographing mode imaging apparatus 1 is currently set. The photographing mode is selected by a mode dial provided in operating section 27. CPU 29 acquires mode information from the mode dial.

Further, in step S130, CPU 29 determines the photographing parameters. To be more specific, CPU 29 determines the photographing parameters, referring to the table shown in FIG. 2, based on the mode information acquired in step S120. To be more specific, with the example of FIG. 2, in case of auto mode and P/S/A/M modes, the shutter speed (SS), the aperture value (AV), the ISO sensitivity (ISO) and the exposure correction (±) are determined as the photographing parameters for exposure, the white balance (WB) is determined for color, and the area and the allowable depth are determined for focus.

Further, in step S140, CPU 29 sets part of the photographing parameters. To be more specific, CPU 29 sets part of the photographing parameters determined in step S130. With the example of FIG. 2, in case of auto mode and P/S/A/M modes, CPU 29 sets only the focus adjustment conditions of the area and the allowable depth which are the photographing parameters for focus in the photographing parameters determined in step S130. This setting is performed based on, for example, the evaluation history table (see FIG. 3). On the other hand, CPU 29 does not set the photographing parameters for exposure and color in this stage. For example, CPU 29 does not set the shutter speed and makes moving images shot at the shutter speed (frame rate) for moving images.

Further, in step S150, CPU 29 performs the distance measurement and focus adjustment operation (that is, AF operation) to decide whether or not focus is adjusted. To be more specific, CPU 29 performs the distance measurement and focus adjustment operation based on the photographing parameters (the focus adjustment conditions of the area and the allowable depth) set in step S140 and decides whether or not focus is adjusted. The distance measurement and focus adjustment operation refers to an operation of automatically measuring the distance to the subject (distance measurement) and adjusting focus (focus adjustment) based on the photographing parameters (the focus adjustment conditions of the area and the allowable depth) set in step S140. As a result of this decision, the flow proceeds to step S170 when focus is adjusted (S150: YES) and proceeds to step S160 when focus is not adjusted (S150: NO).

In step S160, focus lens driving section 11 drives the focus lens and the flow returns to step S150. To be more specific, CPU 29 drives focus lens 9 by controlling focus lens driving section 11 through camera controlling section 15 so as to meet the focus adjustment conditions (area and allowable depth) set in step S140. Then, processing returns to step S150. That is, step S150 and step S160 are repeated until the focus adjustment conditions (area and allowable depth) set in step S140 are met.

In step S170, display section 25 displays focus adjustment. To be more specific, CPU 29 displays the focus adjusted state that meets the current focus adjustment conditions (area and allowable depth) in display section 25. For example, in this focus adjusted state, moving images are shot at the shutter speed (frame rate) for moving images and displayed in display section 25. By this means, the photographer is able to evaluate the photographing parameters for focus by looking at the moving images displayed in display section 25. Further, at this point, a display in display section 25 is preferably emphasized by displaying of an area, highlighting of the focus position and highlighting of the subject at the allowable depth, so that the photographer can readily confirm the parameters.

Further, in step S180, CPU 29 decides whether or not the evaluation button is pressed in a predetermined period. To be more specific, CPU 29 decides whether or not the evaluation button provided in operating section 27 has been pressed in the predetermined period from the time the focus adjustment display in step S170 has started. It is preferable to make the "predetermined period" in this step configurable because the speed and criterion to make decision varies between photographers. As an example, the "predetermined period" is configurable in the range between 50 milliseconds and 2 seconds. As explained above, when focus adjustment is displayed, for example, the focus adjusted state meeting the current focus adjustment conditions (area and allowable depth) are displayed as moving images in display section 25. If the photographer looks at the moving images and does not like the current photographing parameters (focus adjustment conditions), the photographer can communicate his intension (negative evaluation for the photographing parameters) to the camera (imaging apparatus 1) by operating the evaluation button. By this means, the camera (imaging apparatus 1) is able to decide that the photographer does not like the photographing parameters (focus adjustment conditions) that are currently set and decide that photographing parameters (for exposure and color) that are not currently set have not been evaluated. As a result of this decision, the flow proceeds to step S190 when the evaluation button is pressed in the predetermined period (S180: YES) and proceeds to step S200 when the evaluation button is not pressed in the predetermined period (S180: NO). Further, the "predetermined period" in step S180 may end when the half-press operation of the shutter button is released. Furthermore, the "predetermined period" in step S180 may end when a predetermined period passes after the half-press operation of the shutter button is released.

In step S190, CPU 29 changes and stores the focus adjustment conditions. To be more specific, CPU 29 changes the focus adjustment conditions negatively evaluated in step S180 and sets new focus adjustment conditions. Then, CPU 29 stores the focus adjustment conditions negatively evaluated in step S180 as NG conditions, in storing section 21. The focus adjustment conditions are changed based on, for example, the evaluation history table (see FIG. 3). That is, the focus adjustment conditions are changed by using the evaluation history table and selecting the candidate setting value of the next priority. Further, the NG conditions are stored by, for example, updating the evaluation history table (see FIG. 3), that is, by incrementing the corresponding NG evaluation count by one in the evaluation history table. After the focus adjustment conditions are changed and stored, the flow returns to step S150 and CPU 29 performs the distance measurement and focus adjustment operation (AF operation) based on the changed focus adjustment conditions. That is, until the evaluation button is not pressed in the predetermined period, in other words, until the photographer likes the current photographing parameters (focus adjustment conditions), the processings in step S150 to step S190 are repeated.

In step S200, the photographer performs the shutter full-press operation. This shutter full-press operation is performed by the photographer by fully pressing the shutter button provided in operating section 27.

In step S210, CPU 29 stores the changed conditions in storing section 21. To be more specific, the focus adjustment conditions changed immediately before in step S190, that is, values after the photographing parameters are changed when the operation button is operated in case where the full-press operation of the shutter button is performed after the evaluation button is operated, are stored as the OK conditions. To be more specific, for example, setting data is overwritten by changed data. The operation proceeds to the shutter full-press operation, so that CPU 29 is able to decide (decide by estimating) that the immediately preceding condition changes are good, that is, that the photographer is satisfied with the changed conditions. Further, for the purpose of customizing the camera through learning, that is, for the purpose of acquiring an almost satisfying result according to a photographing scene, improving the reliability of the conditions by overwriting the conditions with changed data as explained above matches the purpose. Further, as a method of storing photographing parameters, there is a method of holding the photographing parameters of FIG. 2 per scene mode in the form of the table in FIG. 3. To be more specific, with P/S/A/M modes, for example, a plurality of scenes are classified based on the conditions in which a scene can be assumed (for example, the distribution and range/positions of color, the distribution and range/positions of brightness, and the distance and its distribution) and the photographing parameters in FIG. 2 are stored per scene in the form of the table of FIG. 3.

Then, in step S220, CPU 29 sets the rest of the photographing parameters. To be more specific, CPU 29 sets the rest of the photographing parameters which are not set in step S140 in the photographing parameters determined in step S130. For example, with the example of FIG. 2, in case of auto mode and P/S/A/M modes, CPU 29 sets the exposure condition of the shutter speed (SS), the aperture value (AV), the ISO sensitivity (ISO) and the exposure correction (±) which are the photographing parameters for exposure and the color condition of the white balance (WB) which is the photographing parameter for color. This setting is carried out based on, for example, the evaluation history table (see FIG. 3). Further, for ease of explanation, part of photographing parameters set in step S140 upon the shutter half-press operation are referred to as "the photographing parameters of the previous setting" and the rest of the photographing parameters set in step S220 after the shutter full-press operation are referred to as "the photographing parameters of the subsequent setting."

Then, in step S230, imaging apparatus 1 performs the photographing operation. To be more specific, imaging apparatus 1 performs photographing based on the latest values of the photographing parameters of the previous setting stored in step S210 and the values of the photographing parameters of the subsequent setting set in step S220.

Then, in step S240, display section 25 displays photographed images. To be more specific, the images photographed in step S230 are displayed in display section 25.

Then, in step S250, it is decided whether or not the evaluation button is pressed in a predetermined period. To be more specific, it is decided whether or not the evaluation button provided in operating section 27 is pressed in the predetermined period from the time the photographed images display in step S240 has started. If the photographer looks at the photographed images displayed in display section 25 and does not like the current photographing parameters (photographing parameters except the photographing parameters of the previous setting, that is, the exposure condition and the color condition), the photographer can communicate his intention (the negative evaluation for the photographing parameters) to the camera (imaging apparatus 1). By this means, the camera (imaging apparatus 1) is able to decide that the photographer does not like the photographing parameters (the exposure condition and the color condition) that are currently set. As a result of this decision, the flow proceeds to step S260 when the evaluation button is pressed in the predetermined time (S250: YES), and finishes the above series of processings on assumption that the photographer likes the acquired photographed images if the evaluation button is not pressed in the predetermined period (S250: NO). Further, the "predetermined period" in S250 and the "predetermined period" in S180 need not to be the same and are assigned different values. Further, preferably, the end of the "predetermined period" in S250 matches with the end of a period for displaying the photographed images. Further, it is preferable that a function for setting the period for displaying the photographed images is provided. This is because, when the period for displaying the photographed images is set longer, the time the photographer takes to decide whether to press the evaluation button by evaluating the photographed images becomes longer.

In step S260, the exposure condition and color condition (hereinafter "the exposure condition and the like") are changed and stored. To be more specific, the exposure condition and the like negatively evaluated in step S250 are changed and new focus adjustment conditions are set. Then, CPU 29 stores the focus adjustment conditions negatively evaluated in step S250, in storing section 21 as NG conditions. The exposure condition and the like are changed based on, for example, the evaluation history table (see FIG. 3). That is, the exposure condition and the like are changed by selecting the candidate setting value of the next priority using the evaluation history table. Further, the NG conditions are stored by, for example, updating the evaluation history table (see FIG. 3), that is, by incrementing the corresponding NG evaluation count by one in the evaluation history table. After the exposure condition and the like are changed and stored, the flow proceeds to step S110. That is, until the evaluation button is not pressed in the predetermined period after the shutter full-press operation, in other words, until the photographer likes the current photographing parameters (the focus adjustment conditions, and the exposure condition and the like), the processings in step S110 to step S260 are repeated.

In this way, with the present embodiment, the evaluation button is provided, so that, based on the timing to press the evaluation button, the camera is able to automatically narrow down candidates of the photographing parameters to evaluate. Consequently, the camera is able to specify undesirable photographing parameters from auto photographing parameters.

Further, when the evaluation button is operated, the photographing conditions change, so that the photographer can operate the evaluation button for the purpose of changing the photographing conditions. By so doing, it becomes easier for the camera to acquire information showing that the photographer does not like the set photographing parameters. That is, when the photographer operates the evaluation button for a purpose other than evaluation of photographing parameters, the camera can also perform this evaluation at the same time. With the present embodiment, the function for the operation of changing the photographing conditions is combined with the evaluation button, so that the present embodiment further provides the above advantage.

Further, although, with the present embodiment, the function for the operation of changing the photographing conditions is combined with the evaluation button, the function for the operation of deleting photographed images may be combined with the evaluation button. In this case, the photographer performs an operation of deleting images, so that it is easier for the camera to acquire information showing that the photographer does not like the set photographing parameters.

Further, although, with the present embodiment, when the shutter button is half-pressed or in any stage after the shutter button is fully pressed, the photographing parameters to be evaluated by the evaluation button are the entire photographing parameters of the previous setting or the subsequent setting and are not assumed to be selected by the photographer, the present invention is not limited to this. For example, when the shutter button is half-pressed and/or after the shutter button fully pressed, it may be possible to provide an evaluation parameter selecting section for receiving the photographer's operation of selecting the photographing parameters to evaluate from the photographing parameters of the previous setting and/or the subsequent setting. By this means, it is possible to narrow down selection items in case where the user selects the evaluation parameters.

Further, as other methods, there is a method of providing an operating section for estimating that photographing parameters that have been set are preferable. This method makes it difficult for this operating section to operate for a purpose other than evaluation of photographing parameters. Consequently, the present embodiment is more preferable than other methods.

Further, CPU 29 is an example of a parameter determining section. CPU 29 is also an example of a parameter setting section. CPU 29 is also an example of a parameter changing section. Imaging element 17 is an example of a moving image acquiring section.

The above imaging apparatus is particularly useful as an imaging apparatus that can readily specify undesirable photographing parameters from auto photographing parameters.

What is claimed is:

1. An imaging apparatus comprising:
   a parameter determining section that determines a plurality of photographing parameters to be set when a subject is photographed;
   a parameter setting section that sets each value of part of the plurality of determined photographing parameters;
   a moving image acquiring section that acquires a moving image using the part of set photographing parameters;
   a display section that displays the acquired moving image;
   a shutter button that is depressible in two depths to be partly-pressed and fully pressed;
   an evaluation button that evaluates the photographing parameters, the evaluation button being a separate button from the shutter button; and
   a parameter changing section that, when the evaluation button is operated while the moving image is displayed, changes at least one of values of the part of set photographing parameters,
   wherein the moving image acquiring section acquires an updated moving image using the changed set of photographing parameters and the display section displays the updated moving image.

2. The imaging apparatus according to claim 1, further comprising a storing section that stores a value of a photographing parameter before or after the photographing parameter changed by the parameter changing section changes,
   wherein the parameter setting section sets the value of the photographing parameter based on the value of the photographing parameter before or after the photographing parameter stored in the storing section changes.

3. The imaging apparatus according to claim 1, wherein, in case where the shutter button is partly-pressed, when the evaluation button is operated while the moving image is displayed, the parameter changing section changes the at least one of values of the part of set photographing parameters.

4. The imaging apparatus according to claim 2, wherein, when the shutter button is fully pressed after the evaluation button is operated, the storing section stores the value of the photographing parameter after the photographing parameter changed when the evaluation button is operated changes.

5. The imaging apparatus according to claim 4, wherein:
   when the shutter button is fully pressed, the parameter setting section sets values of a rest of photographing parameters in the plurality of determined photographing parameters; and
   the imaging apparatus further comprises an imaging section that photographs the subject using the part of set photographing parameters or the changed photographing parameters and the rest of set photographing parameters.

6. The imaging apparatus according to claim 5, wherein:
the display section displays an image photographed by the imaging section; and
when the evaluation button is operated while the photographed image is displayed, the parameter changing section changes the at least one of the values of the rest of set photographing parameters.

7. The imaging apparatus according to claim 5, further comprising a selection operating section that receives an operation of selecting photographing parameters to evaluate from the part of photographing parameters and/or from the rest of photographing parameters after the shutter button is partly-pressed and/or fully pressed.

* * * * *